(12) United States Patent
Abanami et al.

(10) Patent No.: US 9,910,573 B2
(45) Date of Patent: Mar. 6, 2018

(54) ADAPTABLE TRANSPARENCY

(71) Applicant: MICROSOFT TECHNOLOGY LICENSING, LLC, Redmond, WA (US)

(72) Inventors: Thamer A. Abanami, Seattle, WA (US); Julian Selman, Redmond, WA (US); Craig Maitlen, Woodinville, WA (US); Russell E. Glaser, Woodinville, WA (US); Rowland Lee Brown, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 459 days.

(21) Appl. No.: 14/053,307

(22) Filed: Oct. 14, 2013

(65) Prior Publication Data

US 2014/0040802 A1 Feb. 6, 2014

Related U.S. Application Data

(62) Division of application No. 11/554,676, filed on Oct. 31, 2006, now Pat. No. 8,584,028.

(51) Int. Cl.
*G06F 3/0484* (2013.01)
*G06F 3/0481* (2013.01)
*G06F 3/0482* (2013.01)

(52) U.S. Cl.
CPC ........ *G06F 3/04845* (2013.01); *G06F 3/0481* (2013.01); *G06F 3/0482* (2013.01); *G06F 2203/04804* (2013.01)

(58) Field of Classification Search
CPC ......... G06F 2203/04804; G06F 3/0481; G06F 3/0482; G09G 2340/12; G09G 2340/14; G09G 3/20
See application file for complete search history.

(56) References Cited

U.S. PATENT DOCUMENTS

| | | |
|---|---|---|
| 5,463,728 A | 10/1995 | Blahut et al. |
| 5,590,265 A | 12/1996 | Nakazawa |
| 5,651,107 A | 7/1997 | Frank et al. |
| 5,896,131 A | 4/1999 | Alexander |
| 6,118,427 A | 9/2000 | Buxton et al. |
| 6,185,582 B1 | 2/2001 | Zellweger et al. |
| 6,359,631 B2 | 3/2002 | DeLeeuw |
| 6,429,883 B1 | 8/2002 | Plow et al. |
| 6,587,118 B1 | 7/2003 | Yoneda |
| 6,928,624 B1 | 8/2005 | Estipona |
| 7,190,976 B2 | 3/2007 | Enns et al. |
| 7,400,422 B2 | 7/2008 | Brown et al. |

(Continued)

OTHER PUBLICATIONS

"Font colors and background", Colin Koteles, Dec. 27, 2002 (as indicated by Internet Archives.org), http://web.archive.org/web/20021227003957/http://www.w3.org/WAI/UA/TS/html401/cp0403/0403-FONT-COLOR.xml.*

(Continued)

*Primary Examiner* — Namitha Pillai
(74) *Attorney, Agent, or Firm* — Alleman Hall Creasman & Tuttle LLP

(57) ABSTRACT

By adjusting visual settings on a display behind a section of a background to emphasize menu options, a user can determine the status in the series of menus and sub-menus and can better read the menu options.

17 Claims, 3 Drawing Sheets

(56) References Cited

U.S. PATENT DOCUMENTS

| | | | |
|---|---|---|---|
| 7,930,650 B2* | 4/2011 | Brodersen | G06F 3/0486 715/810 |
| 2005/0200909 A1* | 9/2005 | Kim | H04N 1/00241 358/448 |
| 2005/0210400 A1 | 9/2005 | Hoe-Richardson | |
| 2006/0059432 A1* | 3/2006 | Bells | G06F 3/0481 715/768 |
| 2008/0235606 A1 | 9/2008 | Brown et al. | |

OTHER PUBLICATIONS

Bonda, Alberto T., "Usability Evaluation of Transparent User Interface for Small Display Terminals," Performed at NEC Kansai Lab, Sep. 2003, 62 pages.

Harrison, Beverly L. et al., "Transparent Layered User Interfaces: An Evaluation of a Display Design to Enhance Focused and Divided Attention," Proceedings of the SIGCHI Conference on Human Factors in Computing Systems, May 1995, 14 pages.

Ishak, Edward W. et al., "Interacting with Hidden Content Using Content-Aware Free-Space Transparency," Proceedings of the 17th Annual ACM Symposium on User Interface Software and Technology, Oct. 2004, pp. 189-192.

\* cited by examiner

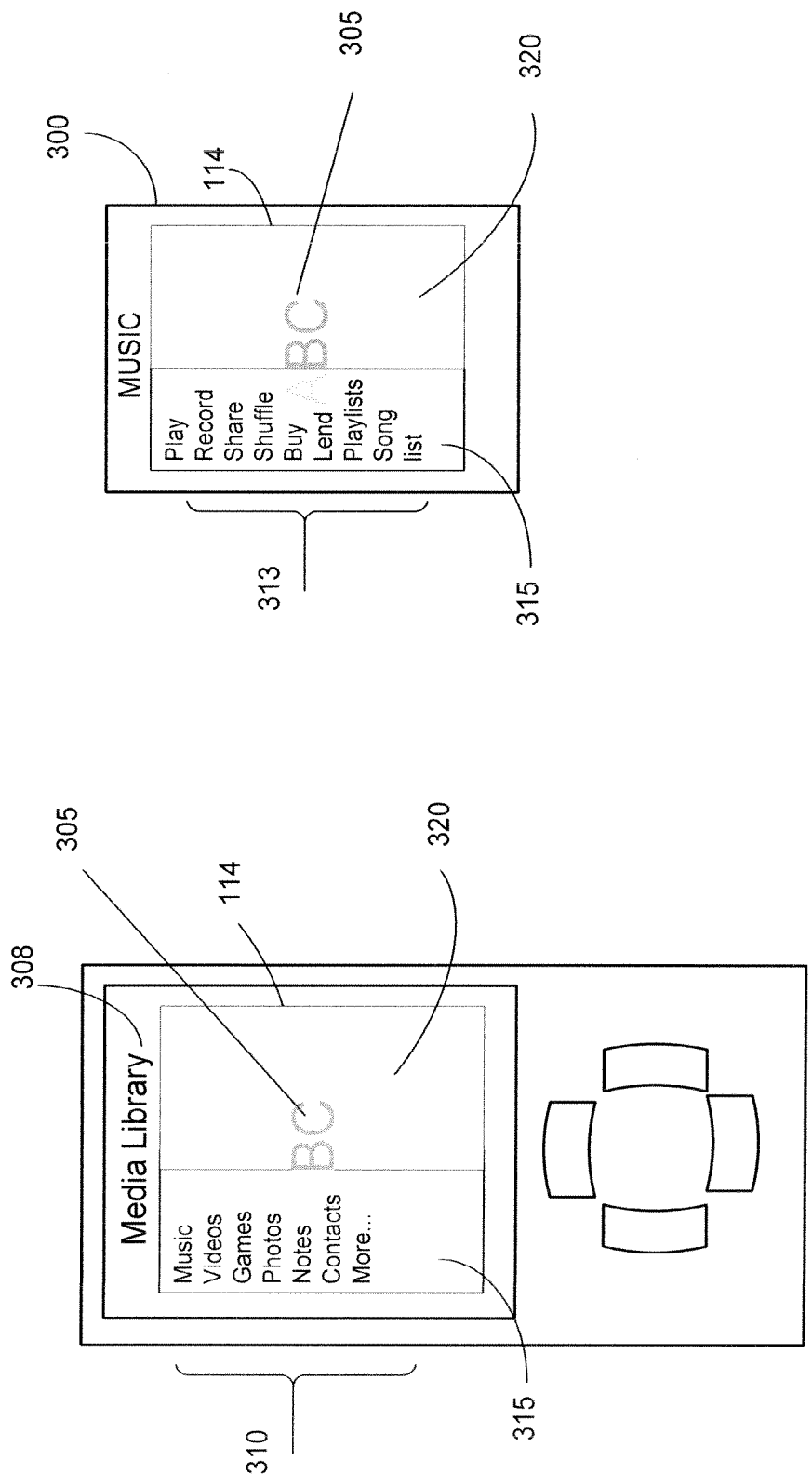

ADAPTABLE TRANSPARENCY

CROSS-REFERENCE to Related Applications

This application is a divisional of U.S. patent application Ser. No. 11/554,676, filed Oct. 31, 2006 and titled ADAPTABLE TRANSPARENCY, the entire disclosure of which is hereby incorporated by reference, issued as U.S. Pat. No. 8,584,028.

BACKGROUND

Personal media players continue to grow in popularity. From portable radios to mobile phones to portable video players, there is demand for portable devices players to have additional functionality. However, additional functionality has a cost in that additional functionality also means additional complexity in menus. Attempting to navigate through all the available options can be confusing and frustrating in that users may not know how far into a series of menus they may have gone. In addition, part of the additional functionality allows users to personalize the players such as using their own photographs as a background on the display of the player. As a result, standard colors for displays such as menus may be washed out when viewed in front of the user selected background.

SUMMARY

As media players increase functionality, the ability to read and attractively determine status in a series of menus and sub-menus is increasingly difficult. By adjusting visual settings on a background image behind a section of a menu of options, a user can determine the status in the series of menus and sub-menus and can better read the menu options. The background section to be adjusted may be set in advance or may be determined based on the length of the options in the menus. In addition, the size of the background image may be adjusted to reflect how far into the series of menus and submenus the user has progressed. In effect, the user may perceive the deeper into the series of menus and submenus they proceed, the closer the background image becomes and the user may be able to determine just by looking at the background image the relative depth they have proceeded in the menu and series of submenus.

DRAWINGS

FIG. 3a is an illustration of a media player with a display; and

FIG. 3b is an illustration of the display of the media player.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
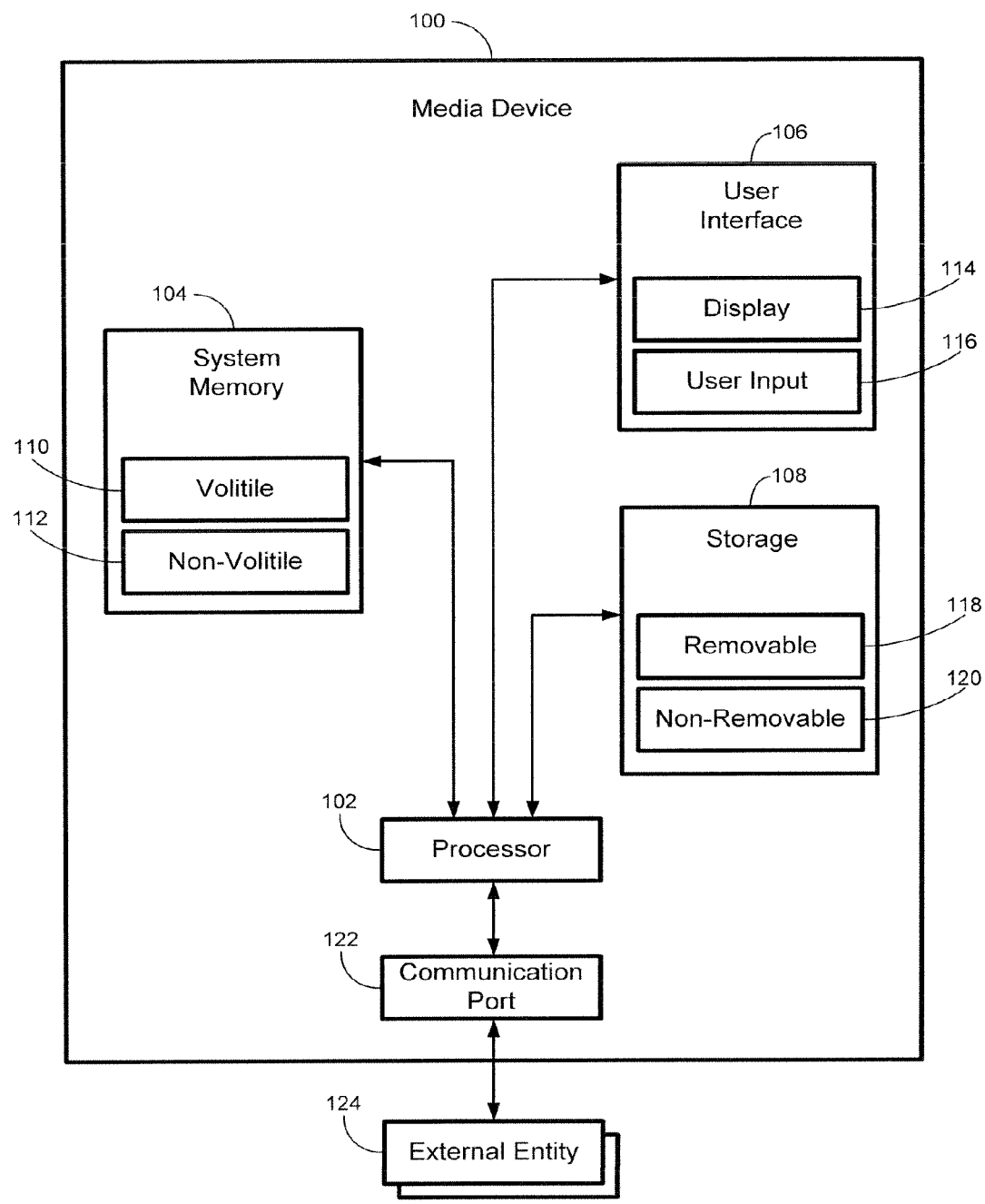
FIG. 1 is an illustration of the components that make up a media player.

FIG. 1 is an illustration of exemplary hardware that may be used for a media player 100. The media player 100 may have a processing unit 102, a memory 104, a user interface 106, a storage device 108 and a power source (not shown). The memory 104 may include volatile memory 110 (such as RAM), non-volatile memory 112 (such as ROM, flash memory, etc.) or some combination of the two.

The media player 100 may also include additional storage 108 (removable and/or non-removable) including, but not limited to, magnetic or optical disks or tape or any other memory that can be easily rewritten, may keep data for long periods of time when power is removed, and may allow quick and efficient access to data. Such additional storage is illustrated in FIG. 1 by removable storage 118 and non-removable storage 120. Computer storage media includes volatile and nonvolatile, removable and non-removable media implemented in any method or technology for storage of information such as computer readable instructions, data structures, program modules, digital media, or other data. Memory 104, removable storage 118, and non-removable storage 120 are all examples of computer storage media. Computer storage media includes, but is not limited to, RAM, ROM, EEPROM, flash memory or other memory technology. Any such computer storage media may be part of player 100.

The processing unit 102 may be any processing unit 102 capable of executing computer code to decode media data from a compressed format into a useable form fast enough such that music and video may be played continuously without skips or jumps. When in a portable media player, it may also be useful if the processor 102 efficiently uses power to increase the life of the power source. The processing unit 102 may also be used to execute code to support a user interface and external communications.

The user interface may include one or more displays 114 for both displaying control information and displaying viewable media. The display 114 may be a color LCD screen that fits inside the player 100. User input(s) 116 may include either manual buttons, soft buttons, or a combination of both. Soft buttons may be used when the display 114 includes a touch screen capability. Manual buttons may include re-definable keys with programmable legends.

The media player 100 may also contain communications connection(s) 122 that allow the player 100 to communicate with external entities 124, such as network endpoints, other media players, network access points, or a computer used for synchronization. Communications connection(s) 122 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The power source may be a battery that may be rechargeable. The power source may also be a standard battery or an input from a power converter.

In operation, a user may connect to external entities 124 through a variety of network types to include local and wide area networks using any number of communication protocols and standards. For example, a media player may connect to a network implementing any of the Ethernet, ARCNet, FDDI, IEEE 1394, Token Ring, or TCP/IP standards. Media players may connect to each other through a central access point or in an ad hoc fashion. Once connected, the players may share and transfer data files including media content.

Figure 2:
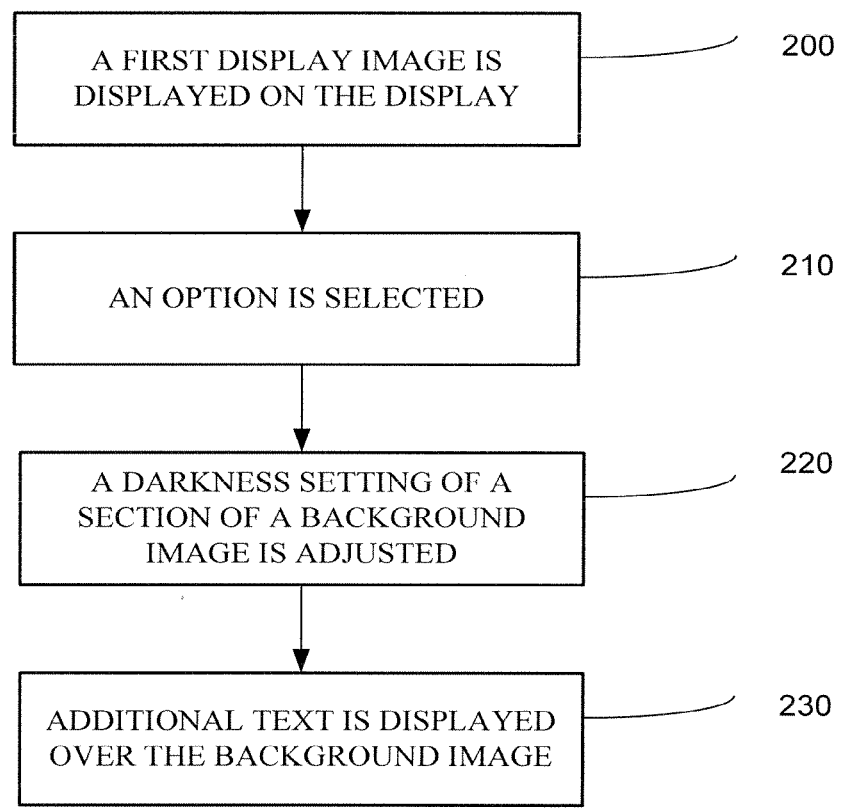
FIG. 2 is an illustration of a flowchart of a method of adjusting a darkness setting of a section of the background image.

FIG. 2 is an illustration of one embodiment of a method of displaying data on the display 114 of a portable media player 100. At block 200, a first display image 300 may be displayed on the display 114 where the display image may include a background image 305 and text 310. In one embodiment, the text is a menu of options 310. The display 114 may be the display 114 as described in reference to FIG. 1 or it may be a separate display in which the media player 100 is in communication such as a flat panel display. More specifically, the portable media player 100 may have the ability to store and play movies, photos and other visual media and it may be desirable to view the visual media on a larger display. The media player 100 may have a communication port 122 that may be connected via wires as inputs to the second display, the communication may be accomplished through a secondary processor such as a cable box or dvd player with input capabilities or through wireless communication methods such as Bluetooth, 802.11, etc.

Referring to FIG. 3*a*, a sample media player is illustrated. On the display 114, a background image 305 (ABC in this illustration) and text 310 (menu options in this illustration) may be thought of as separate images although they may appear as a single image on the display. The background image 305 may be virtually any image that is in a form to be electronically displayed. Common image formats include jpeg, gif, tiff, etc. In addition, the background image 305 may be a moving image such as a moving image in a format such a mpeg, avi, mpeg4, etc. The background image 305 may be stored in the memory 108 of the media device.

The text 310 may be available to be selected via the user input 116. The text 310 may be virtually any text such as text related to the capabilities of the player and the media available to the player, such as menu options. Some sample menu options may be Music, Videos, Games, Photographs, Movies, Notes, Contacts, More, etc., as the media player 100 may be capable of displaying and may have available photographs, movies and music. Of course, additional options are contemplated. The text 310 may appear to hover over the background image 305. For example, in FIG. 3*a*, the background image 305 may be of the letters "ABC" but the text 310 may be read over the background image 305.

At block 210, a selection as may be made. The selection may be the text 310. By selecting the text 310, additional information about the text 310 may be obtained. For example, one text entry 310 may be a menu option for Music and there may be a variety of things that the media player 100 could do with Music such as play the music, change equalization settings of the music, change skins for the music, change the volume of the music, share the music with others, record new music, buy new music, list all the music on the player 100, a list all music available, list playlists, etc. All the potential menu options could fill up the display 114 many times over. As a result, it may makes sense to break the menu options down into smaller related groups and allow the gradual navigation through a smaller number of related menu options of progressively more specific sub-menus. FIG. 3*b* may be an illustration of an embodiment where the additional text 313 to be displayed may be a second menu of options that are related to the text 310 selected. For example, if Music is selected, one or more options related to Music (play, record, shuffle, share, etc.) may be displayed as additional text 313 of additional options on the second menu.

At block 220, a darkness setting or level of transparency of a section 315 of the background image 305 may be adjusted. The concept may be that a user is stepping further into the series of menus and the further a user proceeds into the series of menus, the darker or lighter the background image 305 may become. In addition, the adjusted background section 315 may improve the ability to read the menu options depending on the font color used to display the text 310 and the colors in the background image 305. The section of the background image 315 may be lightened or darkened. In addition, the amount of the adjustment of the darkness setting may have a default amount and the adjustment may be greater or less than the default amount. Further, a variety of display options in the section of the background image may be adjusted such as color, contrast, tint, intensity, brightness, etc., to highlight the section of the background image. The background image 305 may still be viewable through darkened section 315 as the section may still be transparent but it may be more or less transparent to highlight the text 310.

In execution, the adjusting of the section of the background 315 may have a variety of different embodiments. In one embodiment, the section of the background image that is adjusted 315 may be the background image 305 behind the additional text 313. The adjusted background image 305 may be a set area that is known in advance to contain the additional text 313. For example, a section of the background image 305 for displaying the additional text 313 may be assigned and the darkness setting of the section of the display image 315 for displaying a second menu of second options may be increased. More specifically, the left ⅓ of the display image (when looking at the display 114) may be for displaying menus and the left ⅓ of the display image may be the section of the background 315 that may be adjusted.

In another embodiment, a maximum length of the additional text 313 to be displayed may be determined and the section of the background image 315 behind the maximum length of the additional text 313 to be displayed may be adjusted. As the length of the additional text 313 displayed may change for each of the text options 310 in the previous display, the section to be adjusted 315 may also change. For example, if Music is selected in a first menu, the additional text 313 may be a menu option on the sub-menu such as a Playlist where predetermined songs are played but if Video is selected, Playlist may not be an option. Playlist as an option in the second Music menu may be a longer option than any of the options in the second Video menu and as a result, the section to be adjusted 315 in the second menu option for Music may be larger than the section of the second menu option for Videos.

In another embodiment, the section of the background image 315 to be adjusted may be adjusted using a gradient of darkness across the section of the background image 315 to be adjusted. In this embodiment, the section of the background image 315 may be the entire background image. For example, if the darkness setting has a 10 point scale with 10 being the highest setting and 0 being the lowest, the darkness setting may start at 7 on a left side (when looking at the display 114) of the display 114 and fall to 0 on a right side of the display 114. In this embodiment, the menu options may be easier to read as the area behind the options may be darkened and the rest of the background picture may become gradually less dark. In a further embodiment, the adjusted darkness setting may gradually proceed across the display 114 to further emphasize the effect.

In yet another embodiment, the background image 305 may be evaluated to determine a darkness amount in the background image 305 and the darkness setting may be adjusted based on the darkness amount in the background image 305. For example, if the background image 305 is of a white horse in a snow covered field and the font color for displaying the additional text 313 is white, the evaluation may result in the darkness setting to be increased. In another case, if the background image 305 is of a black cat walking in the dark and the font color to display the second menu is black, the evaluation may result in the darkness setting to be decreased and the section of the background may be lightened.

The evaluation may also result in an adjustment of the darkness level greater or less than a default value. Logically, if the background image 305 is evaluated to be significantly darker than the font color for displaying the options in the additional text 313, the darkness setting may be adjusted less than a default amount as the additional text 313 will already be easy to read. Of course, variations are possible and are contemplated. For example, if the default font for displaying the additional text 313 is a dark color and the background image 305 is evaluated to be dark, the section to be adjusted may be adjusted (lightened, for example) more than a default value to make the additional text 313 easier to read.

Similarly, a color used to display the menu of additional text 313 may be evaluated and the darkness setting may be adjusted based on the color used to display the additional text 313. For example, if the default font color for displaying the additional text 313 is black, the darkness setting may be adjusted to lighten the background image 305. In addition, the amount of the adjustment of the darkness setting may be adjusted based on the font color used to display the additional text. For examples, in situations where the font color is close to the color of the background image 305, the amount of the adjustment of the darkness setting may be higher to increase the difference between the background colors and the font color.

The darkness setting may be based on whether a backlight in the media player 100 is on. If the backlight is on, the amount of the adjustment of the darkness amount may be less. In other situations, there may be a desire to preserve battery life and the desire may be to use the minimum amount of power on the display 114, the desire to not use power on the display 114 may trump the desire to highlight a section of the background image 305 in which case the amount of the adjustment of the darkness level may be less.

In an embodiment where an ambient light sensor is part of the media player 100 (for example, communicating to the processor 102 (FIG. 1) through the communication port 122 (FIG. 1)), the darkness setting may be adjusted based on the ambient light measured at the media player 100. For example, if the ambient light sensor has a relatively high reading then the amount of adjustment may be increased beyond a default value as the distinction between the adjusted section 315 and a non adjusted section 320 may be more difficult to notice. In situations where the ambient light reading is relatively low, the amount of adjustment may be less as it may be easier to notice the difference between the adjusted section 315 and the non-adjusted section 320. Further, the ambient light may also affect whether the section to be adjusted 315 is lightened or darkened. If the sensor indicates it is dark, the section to be adjusted 315 may be lightened and in situations where the sensor indicates it is light, the section to be adjusted 315 may be darkened.

The darkness setting may also be adjusted based on whether the media device 100 is in communication with a second display. As the display 114 on the media player 100 may be relatively small in comparison to a second display, a more dramatic adjustment of the darkness of the section 315 of the background image 305 on the display 114 may be necessary as compared to the adjustment necessary to highlight a section 315 on a 50 inch plasma screen, for example. Depending on the capabilities of the media player 100, the media player 100 may be able to recognize the type of second display and make adjustments based on the type of second display. If the second display is not recognized, additional default values may be used that are designed to maximize the effect on a default second display.

The section of the background 315 to be darkened may be adjusted based on the orientation of the additional text 313, the orientation of the background image, the orientation of the text, etc. For example, the display 114 may have a larger length than width as may the media player 100 itself. In a vertical orientation, the longer length of the display 114 may be vertical and the shorter width of the display may be horizontal. The media player 100 may also be turned ninety degrees in which case the longer length will be horizontal and the shorter width may to vertical. Music may have a default vertical orientation and videos may have a default horizontal orientation. As a result of the changing orientation of the media player 100, the background image 305 may rotate also such that the top of the background image may remain at the top of the media player 100 display 114 as the orientation of the media player 100 changes. Accordingly, the section of the background image 315 may also need to change as the orientation of the media player 100 changes. For example, if the display 114 is in a horizontal orientation, the section 315 of the background image 305 that is to be adjusted may be different than if the orientation was vertical as the background picture 305 itself may be adjusted to better fit the orientation.

In another embodiment, the type (lighten or darken) and amount of darkness setting to be used may be adjusted by a user. Some users may desire the adjusted section 315 of the background image to be striking in which case the amount of the darkness setting may be adjusted to a value higher than a default. Other users may not appreciate the usefulness of adjusting the section 315 of the background image 305 in which case the user may adjust the amount of the darkness setting to be below a default value. In another example, the user may have a preferred view of the background image 305 and may decide that lightening the section 315 of the background image 305 is more effective than darkening the section 315 of the background image 305.

Further, the size of the background to be adjusted 315 may be adjustable. Some users may find it preferable to define on their own the section 315 of the background image 305 that is to be adjusted as different users may have different levels of usefulness.

In another embodiment, as a user progresses through the first menu and the sub-menus, the options of the sub-menus may line up further across the display. For example, the first menu 310 may have the option line up vertically one centimeter from the left side of the display 114 (when looking at the display 114), the additional text 313 may be a series of sub-menus where on the first submenu, the options line up vertically two centimeters from the left side of the display 114, the second submenu may have the options line up three centimeters from the left side of the display, etc. Accordingly, the section 315 to be adjusted may also move to stay behind the options.

If a user selects from the second menu to return to a previous display image, the darkness setting for the previous display image may return to an original value.

The darkening may occur in a variety of different ways. In one embodiment, the background image 305 may be thought of as a first layer, a middle layer may be used to provide the desired darkness and the additional text 313 may be a third layer closest to the viewer. The middle layer may be used to provide the type of adjustment (lighten or darken) and the amount of adjustment. For example, if the section of the background image 305 is to be darkened, the middle layer may insert a lighter layer. The layer may adjust a few pixels to obtain the desired effect. For example, every tenth pixel in the section of the middle layer that will overlay the section of the background image 305 to be adjusted may be adjusted to a darker color, for example.

In another embodiment, the section 315 of the background image 305 to be adjusted may be analyzed. In order to obtain the desired type of effect, the pixels in the section to be adjusted 315 may be either darkened or lightened by a desired number of shades. For example, if the desired effect is darkening and the background photo 305 has blue in the section to be adjusted 315, the blue may be adjusted to a darker blue depending on the amount of the darkening desired. Similarly, the if the desired effect is lightening and the background photo 305 has blue in the section to be adjusted 315, the blue may be adjusted to a lighter blue depending on the amount of the lightening desired.

More specifically, the levels of red, green and blue in the section 315 of the background image 305 to be adjusted may be determined. The level of red, green and blue in the section 315 of the background image 305 to be adjusted may be reduced which will darken the section 315. For example, if the levels of red, green and blue were set to 0, the section 315 would be black. Similarly, the amount of red, green and blue may be increased to lighten the section 315.

Referring again to FIG. 2, at block 230, a second menu of second options 313 may be displayed over the background image 305 where the second options 313 are related to the selected option. In addition, when the additional text 313 is displayed, the size of the background image 305 may adjust. For example, the background image 305 may become larger with the concept may be that a user is stepping further into the series of menus and is getting closer to the background image. As a result, the further a user proceeds into the series of menus, the larger the background image may become.

In one embodiment, a first version of the background image 305 is displayed for a first menu 310 and an adjusted version of the background image 305 may be displayed on all other additional text 313 displays. In another embodiment, the background image 305 may be dynamically adjusted as sub-menus are selected. For example, in a first display of additional text 313, the original background image may be increase in size by 10 percent, in a second display of additional text (such as a sub-menu to the first sub-menu) the original background image may be increase in size by 20 percent, and in a third display of additional text, the original background image may be increased in size by 30 percent, etc.

In execution, adjusting the size of images is known. The size of the background image 305 may be adjusted as needed, may be adjusted when the background image 305 is selected or may be adjusted at a time when the player has excess processing capacity and stored for quick future access.

The adjustment of the size of the background image 305 may be independent or the adjustment of the darkness setting of the section of the background image 305 previously described in FIG. 2 or may be related to the adjustment of the darkness setting of the section 315 of the background image 305. For example, in one embodiment, the adjustment in size and the darkening of a section 315 of the background image 305 may happen on demand while in another embodiment, versions of the background image 305 with adjustment in size and the darkening of the section 315 are saved in advance.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. On a portable computing device comprising a processor and a display, a method of displaying data on the display, the method comprising:
   displaying a display image comprising a background image and text;
   receiving selection of a first option;
   responsive to the selection of the first option, adjusting a size of the background image corresponding to a menu depth of a selected menu corresponding to the first option to form a first adjusted background image; and
   displaying additional text over at least a portion of the background image, where the additional text is related to the option selected.

2. The method of claim 1, wherein the additional text comprises a second menu of second options.

3. The method of claim 1, further comprising adjusting a darkness setting of a section of the background image in response to receiving the selection of the first option.

4. The method of claim 3, wherein adjusting the darkness setting comprises adjusting a section of the background image behind the additional text.

5. The method of claim 3, wherein adjusting the darkness setting further comprises:
- determining a maximum length of the additional text to be displayed; and
- adjusting a section of the background image behind the maximum length of the additional text to be displayed.

6. The method of claim 3, further comprising:
- assigning a section of the display image for displaying the additional text; and
- adjusting the darkness setting of the section of the display image for displaying the additional text.

7. The method of claim 3, further comprising:
- evaluating a color used to display the selected menu; and
- adjusting the darkness setting based on the color used to display the selected menu.

8. The method of claim 3, further comprising adjusting the section of the background image based on the orientation of one or more of the text, the additional text, the background image and the display.

9. The method of claim 3, further comprising:
- evaluating the background image to determine a darkness amount in the background image; and
- adjusting the darkness setting based on the darkness amount in the background image.

10. The method of claim 1, further comprising:
analyzing the background image; and
selecting a color for the additional text based on analyzing the background image.

11. The method of claim 1, further comprising adjusting a darkness setting of the background image based on whether a backlight in the portable computing device is on.

12. The method of claim 1, further comprising adjusting a darkness setting of the background image based on ambient light measured.

13. The method of claim 1, further comprising adjusting a darkness setting of the background image based on whether the portable computing-device is in communication with a second display.

14. The method of claim 1, further comprising, if from the display of the additional text a selection is made to return to a previous display image, returning a darkness setting for the previous display image to an original value.

15. A computer readable storage medium comprising computer executable instructions stored in a tangible form for displaying data on a portable media device comprising computer executable instructions for:
- displaying a display image comprising a background image and text;
- allowing selection of a first option;
- responsive to the selection of the first option, adjusting a darkness setting of a section of the background image;
- adjusting a size of the background image corresponding to a menu depth of a selected menu corresponding to the first option to form a first adjusted background image;
- displaying additional text over the section of the background image, where the additional text is related to the selected option and allows selection of a second option;
- receiving a selection of a second option; and
- responsive to the selection of the second option, further adjusting the background image size to correspond to the menu depth after the selection of the second option to form a second adjusted background image of a different size than the background image and the first adjusted background image.

16. The computer readable storage medium of claim 15, wherein the instructions are further executable to:
adjust a background color of a section of the background image behind the additional text to be displayed to a color corresponding to the menu depth of the additional text.

17. The computer readable medium of claim 16, wherein the instructions are executable to:
- determine a maximum length of the additional text to be displayed; and
- adjust a section of the background image behind the maximum length of the additional text to be displayed.

* * * * *